(12) United States Patent
Kiefer

(10) Patent No.: US 8,602,368 B2
(45) Date of Patent: Dec. 10, 2013

(54) LOAD-ADSORBING DEVICE FOR INTRODUCING LOAD FORCES, IN PARTICULAR CABLE FORCES

(75) Inventor: Michael Kiefer, Radolfzell (DE)

(73) Assignee: Carl Stahl GmbH, Sussen (DE)

( * ) Notice: Subject to any disclaimer, the term of this patent is extended or adjusted under 35 U.S.C. 154(b) by 187 days.

(21) Appl. No.: 12/998,613

(22) PCT Filed: Mar. 27, 2009

(86) PCT No.: PCT/EP2009/002254
§ 371 (c)(1),
(2), (4) Date: May 9, 2011

(87) PCT Pub. No.: WO2010/054704
PCT Pub. Date: May 20, 2010

(65) Prior Publication Data
US 2011/0222961 A1    Sep. 15, 2011

(30) Foreign Application Priority Data

Nov. 11, 2008   (DE) .................... 20 2008 014 951 U
Jan. 29, 2009   (DE) .................... 20 2009 001 107 U

(51) Int. Cl.
*F16M 11/02*    (2006.01)

(52) U.S. Cl.
USPC ................ 248/181.1; 248/181.2; 248/288.31; 248/345; 403/122

(58) Field of Classification Search
USPC ...................... 248/181.1, 181.2, 288.31, 345; 403/122, 52; 135/87
See application file for complete search history.

(56) References Cited

U.S. PATENT DOCUMENTS

2011/0217113 A1*  9/2011  Kiefer ............................ 403/122
2011/0222960 A1*  9/2011  Kiefer ............................ 403/122

FOREIGN PATENT DOCUMENTS

| DE | 29 13 703 | 10/1980 |
| DE | 40 19 396 | 5/1991 |
| DE | 43 29 574 | 3/1995 |
| DE | 200 07 374 | 7/2000 |
| FR | 2 884 239 | 10/2006 |

* cited by examiner

Primary Examiner — Todd M. Epps
(74) Attorney, Agent, or Firm — Roylance, Abrams, Berdo & Goodman LLP

(57) ABSTRACT

A load-absorbing device for introducing load forces, in particular cable forces in support devices for tent-shaped coverings and the like, has at least one load-absorbing part (9) on a supporting structure (7). The load-absorbing part (9) is provided on a transmission body (17) forming on at least part of its outer surface, a convex transmission surface (21) which transmits the load forces and which is guided on the supporting structure (7) on carrier surface formed from concave surface parts adapted to the convexity of the transmission surface (21). A load-absorbing node is formed allowing a ball joint-like mobility of the load absorbing part (9) relative to the supporting structure (7).

6 Claims, 4 Drawing Sheets

State of the Art

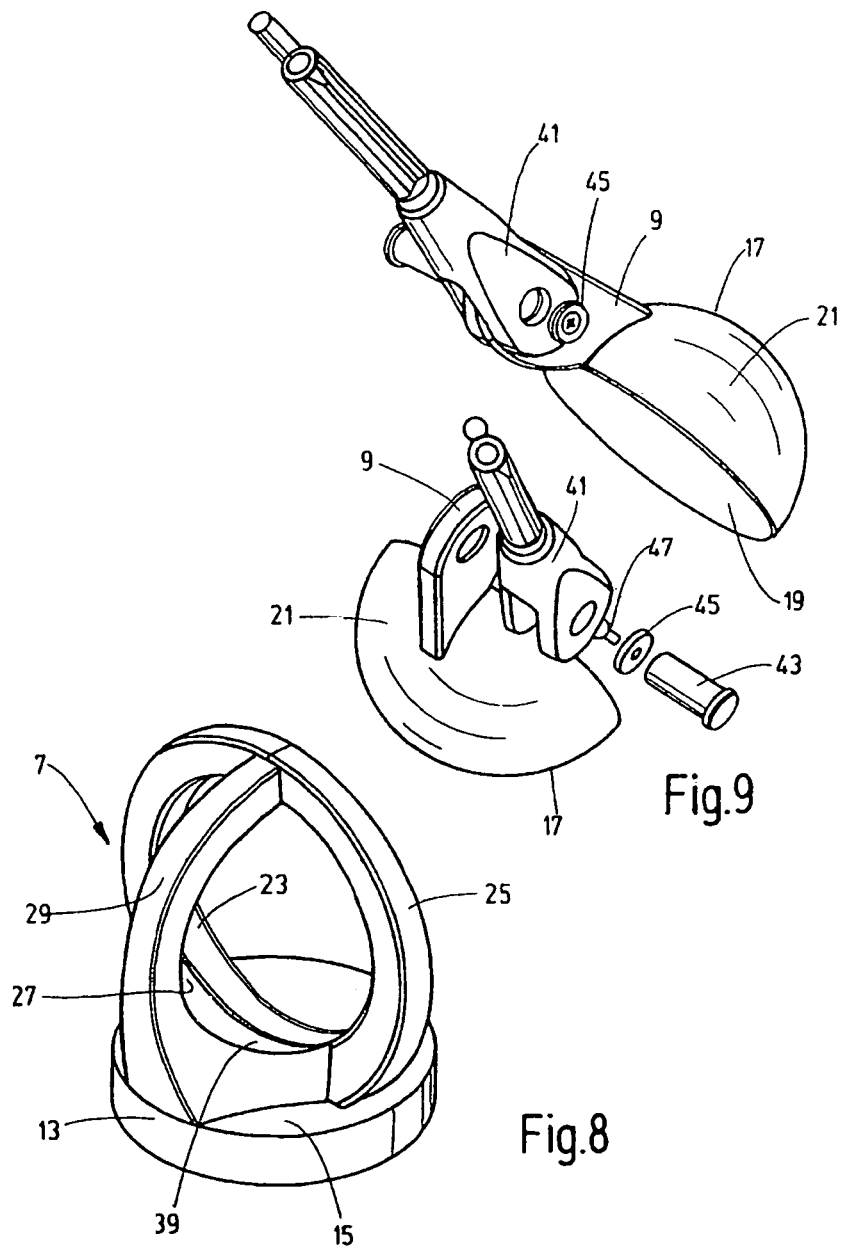

US 8,602,368 B2

LOAD-ADSORBING DEVICE FOR INTRODUCING LOAD FORCES, IN PARTICULAR CABLE FORCES

FIELD OF THE INVENTION

The invention relates to a load-absorbing device for introducing load forces, in particular cable forces in support systems for tent-shaped coverings and the like. The device comprises at least one load-absorbing member on a supporting structure.

BACKGROUND OF THE INVENTION

Modern architecture has increasingly incorporated concepts of load-bearing structures, where planar elements, such as tent-shaped or umbrella-shaped coverings are formed, as a textile building material and form part of a load-bearing structure. The planar elements are anchored or erected on support systems, for example, steel supports. For the respective elements to form space-creating structures of a desired architectural design, the respective suitable introduction of load forces, in particular, the tensioning or bearing cable forces, is a crucial factor. Hence, it must be ensured that the line of action of the cable force that is to be introduced and that acts on the respective support system is independent of the respective orientation (inclination) of the support that is a part of the load-bearing structure to avoid distortions of the desired architectural design.

BACKGROUND OF THE INVENTION

An object of the invention is to provide an improved load-absorbing device that satisfies, in particular, the associated requirements.

The invention basically achieves this object with a load-absorbing device where the load is transferred between the load-absorbing member and the supporting structure by a transmission body forming a convexly curved transmission surface on its outer surface. The transmission surface is guided on the supporting structure on a support surface of the concave support parts. The support parts are adapted to the convexity of the transmission surface. The result of this arrangement is a load-absorbing joint that allows a ball joint-like mobility of the load-absorbing member relative to the supporting structure. This ball joint-like mobility allows the respective load-absorbing member to be adjusted, independently of the respective arrangement of the supporting elements of the support system. Depending on the configuration of a respective load-bearing structure, it involves steel supports of varying orientation or inclination, as a function of the line of action of the engaging cable forces. An optimal anchoring or erecting of the respective tent-shaped or umbrella-shaped element is then ensured. In this case, the load-absorbing joint could also be secured. The supporting structure could be moved relative to the joint.

The transmission surface can be formed in an especially advantageous way by at least one part of a spherical surface.

For the interaction with such a transmission surface, the support surface on the supporting structure may be formed by surface parts that circumscribe parts of a spherical cap. The result is an almost torque-free mobility of the respective load-absorbing member around a plurality of pivot axes or axes of rotation.

In especially advantageous embodiments, the supporting structure has a base body, which can be connected to a pole-like support of the support system and at which one of the surface parts, forming the support surface, is formed by a closed partial ring surface on the interior side of a full ring body. An additional surface part is formed by an approximately half ring-shaped inner surface of a partial ring, the full ring body and the partial ring forming planes perpendicular to each other.

Preferably, a spherical body, with at least one load-absorbing member extending from the spherical body in the radial direction and forming a bracket, is provided as the transmission body. The spherical body is guided on the surface parts of the base body that form the support surface such that the bracket extends in the sector of a circle between the full ring body and the partial ring. Thus, the bracket has a mobility inside the respective spherical quadrants that are situated between the full ring body and the partial ring.

In especially advantageous embodiments, the transmission body has two spherical parts that together form a solid sphere. Each spherical part has a bracket extending on the one and on the other side of the partial ring when the solid sphere is guided on the support surface.

If the arrangement is configured such that the spherical parts forming the solid sphere are hemispheres that on engagement with the support surface rest against each other at their equatorial planes, the brackets then can swivel independently of each other around the axis extending perpendicularly to the equatorial plane inside their respective spherical quadrant and can jointly execute such motions that correspond to the rotational motions of the solid sphere without lifting of the adjacent equatorial planes of the hemispheres.

Preferably, the base body of the supporting structure is formed by a circularly round mounting plate which can be connected to the support. The full ring body and the partial ring extend from the upper side of the mounting plate into respective planes that extend perpendicularly in relation to the plane of the upper side.

Since, in the arrangement of the brackets on the hemispheres in the spherical quadrants adjacent to the interior ring, the cable forces are transferred predominantly by the half ring-shaped inner surface of the partial ring, the arrangement is preferably configured such that the inner surface of the partial ring and the closed partial ring surface of the full ring body merge in the vicinity of the upper side of the mounting plate. The inner surface of the partial ring forms a saddle-shaped expansion at the transition to the full ring body. Due to this expansion, the support surface is enlarged in the region that has the maximum stress in the given arrangement of the brackets, that is, at the base region of the inner surface in the vicinity of the mounting plate. The pressure per unit of area is then reduced in the critical region.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 8 is a perspective view of only the supporting structure without the transmission body of the device of FIG. 1; and FIG. 9 is a perspective view of only those parts of the transmission body with the assigned cable connectors of the device of FIG. 1 in the disassembled state.

DETAILED DESCRIPTION OF THE INVENTION

Figure 1:
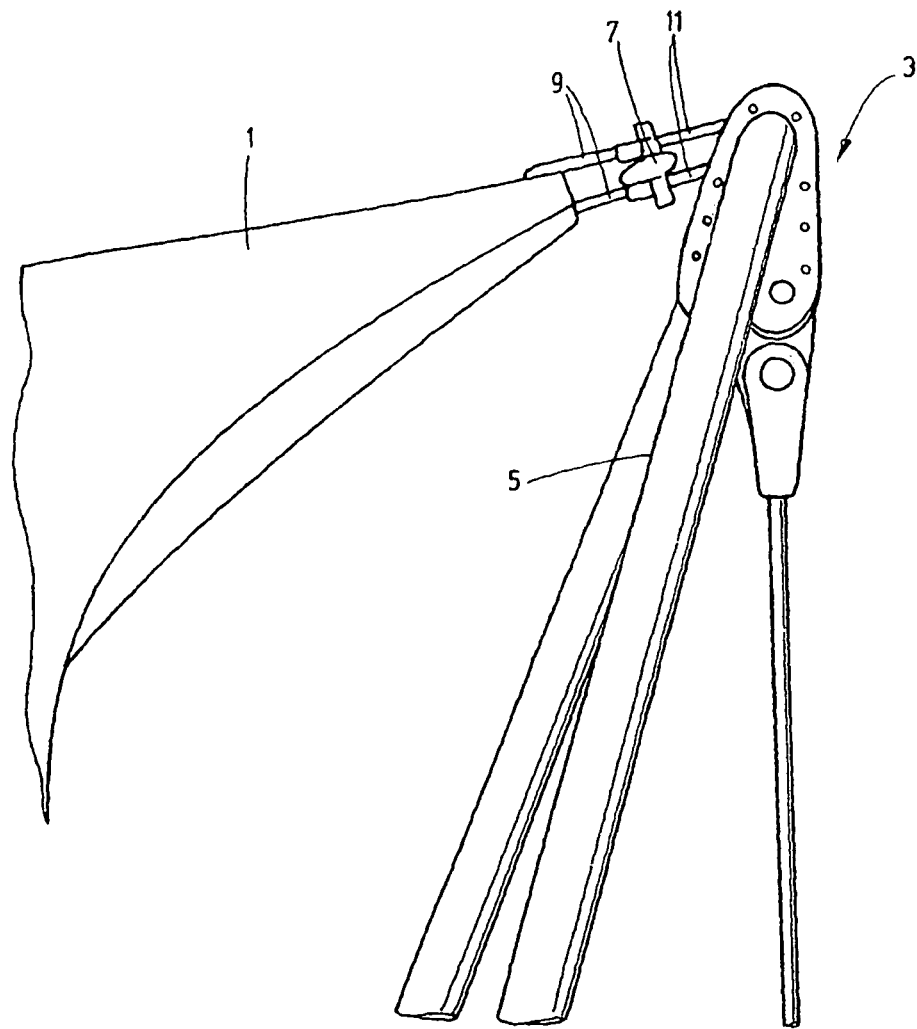
FIG. 1 is a highly simplified, schematic perspective view of a detail of a conventional load-absorbing device of a supporting structure for a tent-shaped covering.
Figure 2:
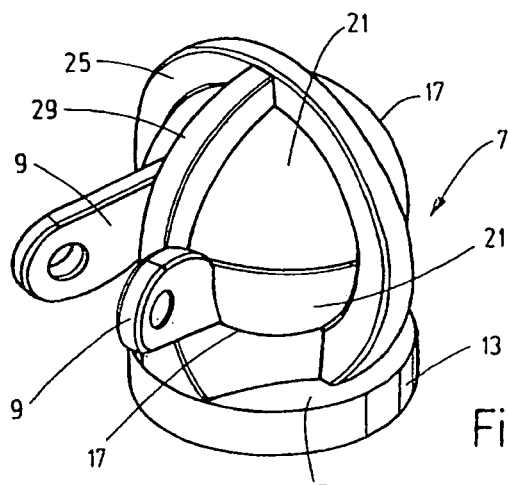
FIG. 2 is a perspective view of a load-absorbing device according to an exemplary embodiment of the invention, that is decreased in size by about a factor of 3 with respect to a practical embodiment.
Figure 3:
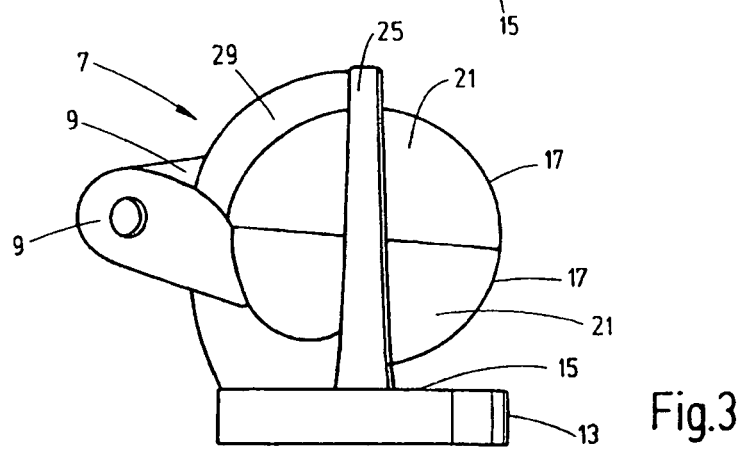
FIGS. 3 and 4 are side elevational views of the device of FIG. 1, seen from the respective opposite sides of the device.
Figure 4:
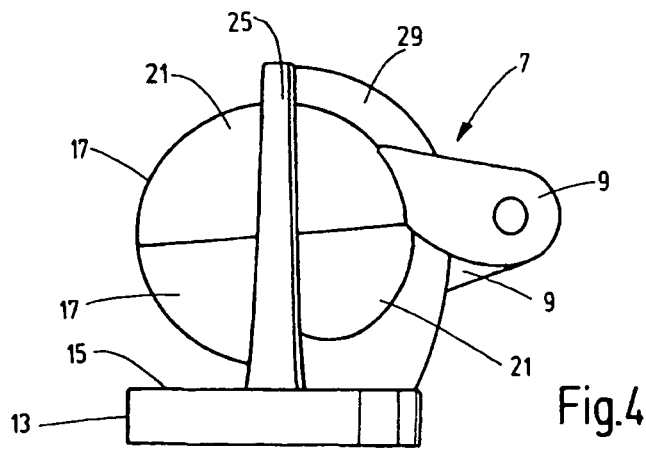
Figure 6:
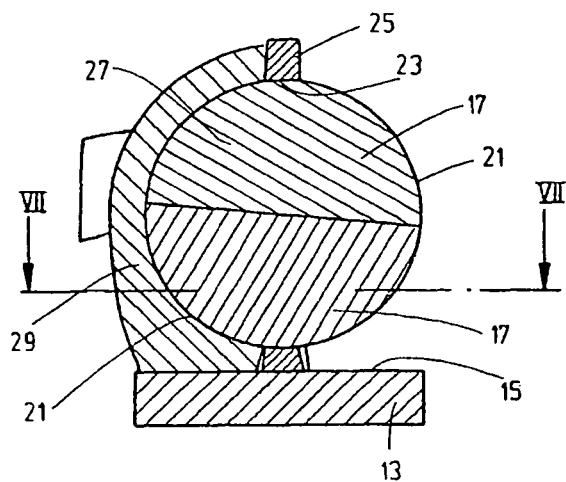
FIG. 6 is a side elevational view in section of the device of FIG. 1 taken along line VI-VI of FIG. 5.
Figure 7:
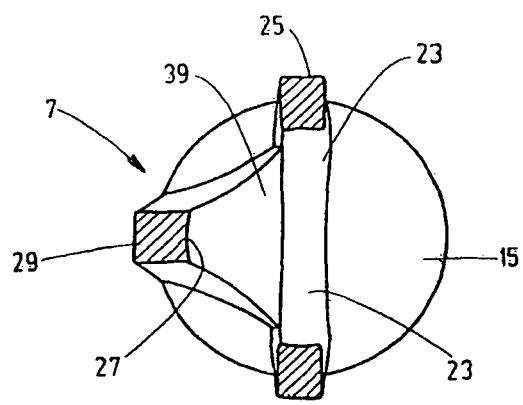
FIG. 7 is a top plan view in section of the device of FIG. 1 taken along line VII-VII of FIG. 6, wherein only the supporting structure without the transmission body therein is shown.
Figure 5:
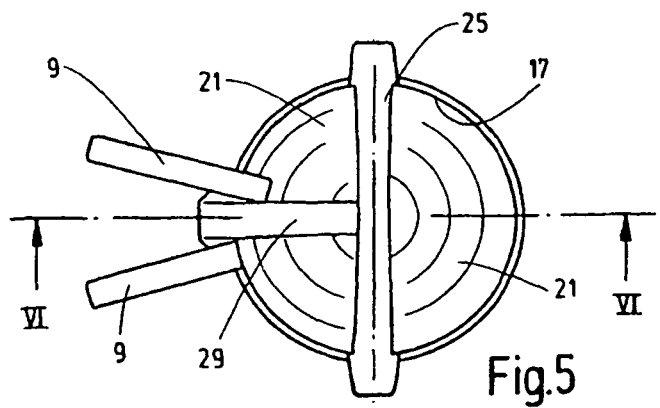
FIG. 5 is a top plan view of the device of FIG. 1.

FIG. 1 shows a conventional load-absorbing device for erecting a tent-shaped covering 1 made of a textile material on a part of a support system 3 forming the load-bearing structure with a two-strut steel support 5. To enable the load to be absorbed along the different lines of action of the engaging cable forces, as a result of the different orientations and inclinations of the steel supports 5 of a load-bearing structure, the supporting structure 7, with which the load-absorbing members engage in the form of brackets 9, is connected to the support system 3 by additional brackets 11 to form a respective moveable connection that can cope with the different lines of action of the cable forces. Such an offset arrangement of the supporting structure 7 is disadvantageous both from the viewpoint of ease of assembly and with respect to the desired aesthetic effect in terms of an attractive high-end design concept for load-bearing structures.

The inventive load-absorbing device depicted in FIGS. 2 to 9 offers the sought-for mobility of the load-absorbing members in a supporting structure 7 that is mounted directly on the support system. In the exemplary embodiment, the supporting structure has a metal base body 13, which can be connected directly to the support system 3, for example, a steel support. The base body has the shape of a circularly round mounting plate with a flat upper side 15. The base body 13 can be screwed or welded to the respective steel support (not illustrated) or another supporting structural element.

FIGS. 2 to 6 show a two-part transmission body in its functional position that it occupies inside the supporting structure 7. This transmission body has load-absorbing members situated on the transmission body and corresponding to the brackets 9 in FIG. 1. The transmission body is formed of two identically constructed metal hemispheres 17, a feature that will be explained in detail below. When these hemispheres rest against each other at their equatorial planes 19, these hemispheres form a solid sphere, as can be seen the best in FIGS. 2 to 4 and 6. In conformity with their spherical shape, the hemispheres 17 form the transmission surface 21 for the force transfer. This transmission surface includes two parts of a whole spherical surface. For the interaction with the convex transmission surface, that is, the spherical transmission surface 21 in the illustrated embodiment, the supporting structure 7 has a support surface formed of concave surface parts that circumscribe parts of a spherical cap in the illustrated embodiment. These surface parts are formed by a self-contained partial ring surface 23 on the interior side of a full ring body 25 and by a half ring-shaped inner surface 27 of a partial ring 29. The full ring body 25 and the partial ring 29 are metallic bodies that are welded or screwed to the upper side 15 of the base body 13 or are constructed as one piece with the base body 13. The full ring body 25 and the partial ring 29 form planes perpendicular to each other.

As especially apparent from FIGS. 2 to 5, in the functional position, the solid sphere composed of the hemispheres 17 is accommodated in the supporting structure 7 on the surface parts 23, 27 which form the support surface, of the full ring body 25 and of the partial ring 29. One bracket 9 is located on each side of the partial ring 29. In this arrangement, the transmission body formed by the hemispheres 17, is held in engagement with the surface parts forming the support surface. That is, the partial ring surface 23 of the full ring body 25 and the inner surface 27 of the partial ring 29 are held in engagement with the hemispheres by the cable forces inside the supporting structure 7. In conformity with the direction of action of the cable forces that are introduced via the brackets 9 extending away from the hemispheres 17 next to the partial ring 29, the force is transferred predominantly over the surface part of the support surface formed by the inner surface 27 of the partial ring 29, and chiefly in the region in which the inner surface 27 of the partial ring 29 in the region of the upper side 15 of the base body 13 passes over into the partial ring surface 23 on the interior side of the full ring body 25. This transition region can be seen the best in FIGS. 7 and 8. As illustrated, the partial ring 29 in this transition region forms a saddle-shaped expansion 39 of the inner surface 27. As a result of the expansion, the support surface is noticeably enlarged in the critical transmission region, so that the pressure per unit of area is low under stress. For the swivel mobility of the hemispheres 17, the results are good friction conditions under load, so that a ball joint-like swivel mobility at low torque is enabled.

FIG. 9 shows the connection between the supporting or tensioning cables (not illustrated) that are mounted on the hemispheres 17 by cable connectors 41. The cable connectors 41 extend over the assigned bracket 9 with forked cable eyes and are secured in a swivelable manner on the brackets by flange bolts 43. The bolts 43 are axially secured in the conventional manner by washers 45 and locking screws 47.

In the illustrated arrangement, the brackets 9 can be moved independently of each other inside the spherical quadrants stretching between the full ring body 25 and the partial ring 29, insofar as a rotation around an axis perpendicular to the equatorial planes 19 occurs. In addition and to some extent together, the brackets 9 can perform in relation to the supporting structure 7 such movements that take place without lifting the equatorial planes 19.

In the illustrated exemplary embodiment, the equatorial planes 19 have smooth surfaces. As an alternative, there could be concentric, intermeshing structures that are recessed in the plane and project from the plane. In the event that these equatorial planes 19 rest against each other, these structures mesh, but prevent the rotational mobility around the axis perpendicular to the equatorial plane 19.

In the present exemplary embodiment, the transmission body and the support surface of the supporting structure are spherical. It is self-evident that, instead of a purely spherical shape with transmission surfaces 21 that are constructed as a spherical surface, it is possible to have a convex curvature that departs from the spherical shape. The concavely curved shape of the partial ring surface 23 and the inner surface 27 on the full ring body 25 or the partial ring 29 of the supporting structure 7 is adapted to this convex curvature, assuming that the convex and concave curvature allows the desired swivel and rotational mobility of the load-absorbing members, that is, the brackets 9, relative to the supporting structure 7.

While one embodiment has been chosen to illustrate the invention, it will be understood by those skilled in the art that various changes and modifications can be made therein without departing from the scope of the invention as defined in the appended claims.

What is claimed is:

1. A load-absorbing device for introducing load forces, particularly cable forces in support systems for tent-shaped coverings, comprising:
    at least one load-absorbing member on a supporting structure;
    a transmission body on which said load absorbing member is mounted, said transmission body having a convex transmission surface on at least one part of an external surface thereof, said convex transmission surface being part of a spherical surface;
    first and second concave support parts forming said support structure and having first and second concave support surfaces, respectively, conforming to said convex transmission surface, said transmission body transferring load forces to and being guided on said support parts to form a load-absorbing joint enabling ball joint mobility of said load absorbing member relative to said supporting structure, said concave support surfaces circumscribing parts of a spherical cap, said first support part being a full ring body with said first concave support surface being a closed partial ring surface formed on an interior side of said full ring body, said second support part being a partial ring with said second concave support surface being an approximately half ring-shaped surface, said full ring body and said partial ring defining planes perpendicular to one another; and
    a base body connected to said concave support parts and connected to a pole-shaped support of a support system.

2. A load-absorbing device according to claim 1 wherein said transmission body is a spherical body with said load-absorbing member extending radially therefrom and forming a first bracket, said spherical body being guided on said concave support parts; and
    said first bracket extends in a sector of a circle on said spherical body between said full ring body and said partial ring.

3. A load-absorbing device according to claim 2 wherein said spherical body comprises first and second body parts forming a solid sphere, said first body part having said first bracket extending therefrom, said second body part having a second bracket extending therefrom, said brackets being on opposite sides of said partial ring.

4. A load-absorbing device according to claim 3 wherein said first and second body parts are hemispheres relatively movably resting against one another on equatorial planes thereof when engaged with said concave support surfaces.

5. A load-absorbing device according to claim 1 wherein said base body comprises a circularly round mounting plate with an planar upper side; and
    said full ring body and said partial ring extend from said upper planar side into said planes that are perpendicular to a plane of said upper planar side.

6. A load-absorbing device according to claim 5 wherein said half-ring shaped surface and said closed partial ring surface merge in a vicinity of said planar upper side of said mounting plate; and
    an inner surface of said half-ring shaped surface having a saddle-shaped extension at a transition thereof to said full ring body.

* * * * *